United States Patent
Simones et al.

(10) Patent No.: US 7,353,617 B1
(45) Date of Patent: Apr. 8, 2008

(54) SURFACE TEMPLATE

(76) Inventors: Marty L. Simones, 880 Quixote Ave., Lakeland, MN (US) 55043; Gary J. Rolfer, 880 Quixote Ave., Lakeland, MN (US) 55043

( * ) Notice: Subject to any disclaimer, the term of this patent is extended or adjusted under 35 U.S.C. 154(b) by 0 days.

(21) Appl. No.: 11/341,232

(22) Filed: Jan. 28, 2006

(51) Int. Cl.
*G01B 3/14* (2006.01)
*E04B 2/00* (2006.01)

(52) U.S. Cl. .................... 33/562; 33/518; 52/287.1

(58) Field of Classification Search ............... 33/562, 33/563, 565, 566, 613, 645, 403, 404, 474, 33/481, 482, 518, 561.1, 561.2, 561.3, 568, 33/573; 52/287.1, 288.1, 86
See application file for complete search history.

(56) References Cited

U.S. PATENT DOCUMENTS

| | | | | | |
|---|---|---|---|---|---|
| 1,097,393 | A | * | 5/1914 | Criswell | 33/481 |
| 1,196,753 | A | * | 9/1916 | Alms | 52/256 |
| 1,430,508 | A | * | 9/1922 | Johnson | 52/256 |
| 1,537,758 | A | * | 5/1925 | Fischer | 52/256 |
| 1,611,930 | A | * | 12/1926 | MacLeod | 33/197 |
| 2,440,701 | A | * | 5/1948 | Sharpe | 211/50 |
| 2,442,929 | A | * | 6/1948 | Marino | 52/85 |
| 3,564,785 | A | * | 2/1971 | Kephart, Jr. | 52/71 |
| 5,283,997 | A | * | 2/1994 | Lackie | 52/287.1 |
| 5,572,834 | A | * | 11/1996 | Lilly | 52/85 |
| 5,658,483 | A | * | 8/1997 | Boeshart | 249/191 |
| 5,761,876 | A | * | 6/1998 | Keady | 52/749.13 |
| 5,897,816 | A | * | 4/1999 | Johnson | 264/35 |
| D426,474 | S | * | 6/2000 | Chang | D10/65 |
| 6,729,088 | B2 | * | 5/2004 | Corr | 52/290 |
| 7,055,256 | B2 | * | 6/2006 | Alecci | 33/392 |
| 2006/0230626 | A1 | * | 10/2006 | Mansfield | 33/562 |

* cited by examiner

*Primary Examiner*—G. Bradley Bennett
*Assistant Examiner*—Amy R. Cohen

(57) ABSTRACT

A surface template is disclosed. In one illustrative embodiment, the surface template includes at least two template panels of similar size and shape and disposed in spaced-apart relationship to each other. Each of the at least two template panels has a pair of side edges disposed in generally perpendicular relationship to each other and a surface edge extending between the pair of side edges. A method of forming a surface between adjoining surfaces is also disclosed.

10 Claims, 3 Drawing Sheets

SURFACE TEMPLATE

FIELD OF THE INVENTION

The present invention relates to construction devices used to construct surface effects or characteristics in walls, ceilings and other surfaces. More particularly, the present invention relates to a surface template which can be attached to two or more adjoining surfaces to facilitate the construction of an arched, curved or alternatively-configured surface between the adjoining surfaces.

BACKGROUND OF THE INVENTION

In the construction of houses and buildings, wall, ceiling and other surfaces having various shapes are frequently formed to create a desired architectural effect. While various techniques may be used to create these effects, it is usually desirable to create such effects using methods and materials which are as simple and cost-effective as possible.

SUMMARY OF THE INVENTION

The present invention is generally directed to a surface template. In one illustrative embodiment, the surface template includes at least two template panels of similar size and shape and disposed in spaced-apart relationship to each other. Each of the at least two template panels has a pair of side edges disposed in generally perpendicular relationship to each other and a surface edge extending between the pair of side edges. The invention is further directed to a method of forming a surface between adjoining surfaces.

BRIEF DESCRIPTION OF THE DRAWINGS

The invention will now be described, by way of example, with reference to the accompanying drawings, in which.

DETAILED DESCRIPTION OF THE INVENTION

Figure 1:
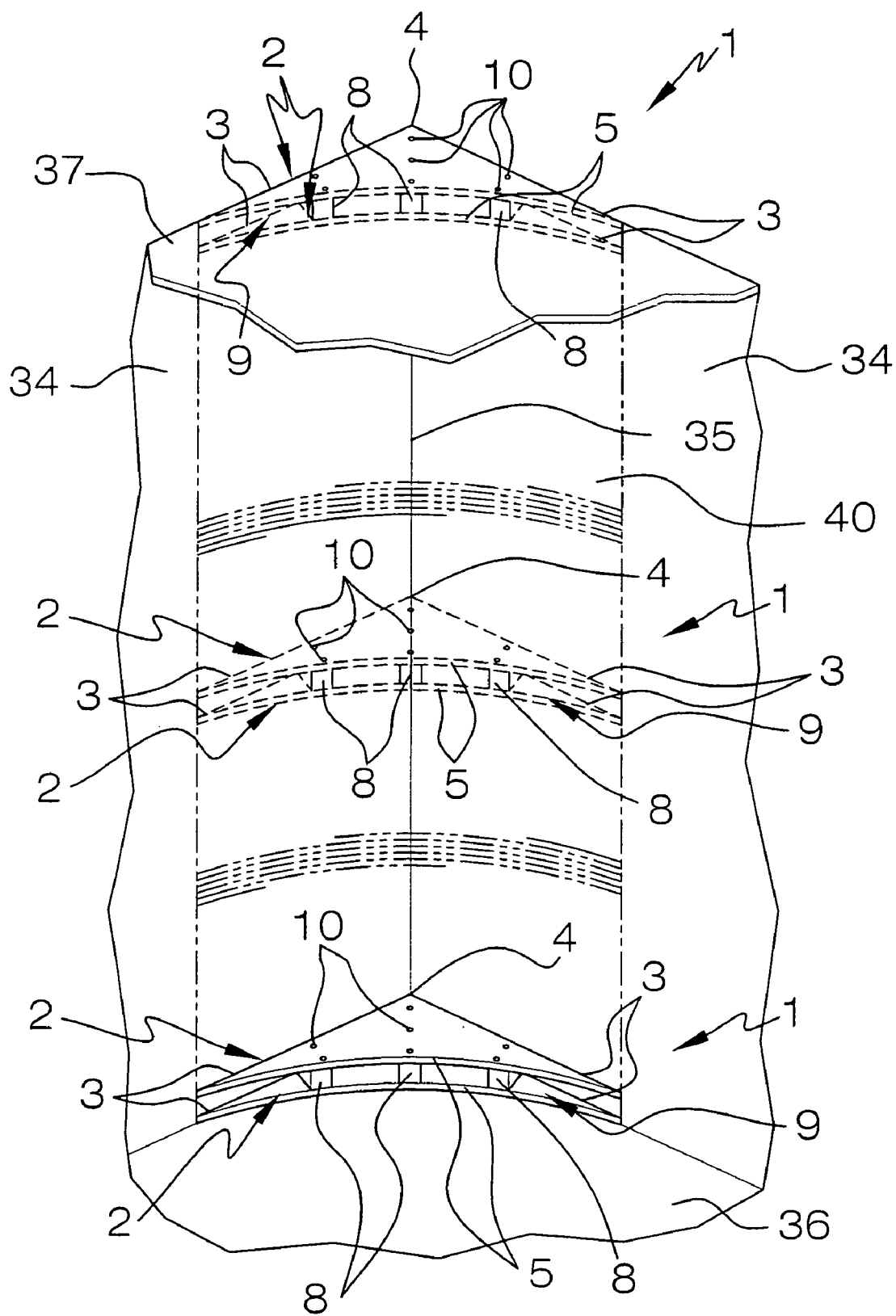
FIG. 1 is a perspective view of multiple pieces of an illustrative embodiment of the surface template according to the present invention, provided in place between adjoining walls and illustrating a curved wall as an exemplary surface provided over the surface templates.
Figure 2:
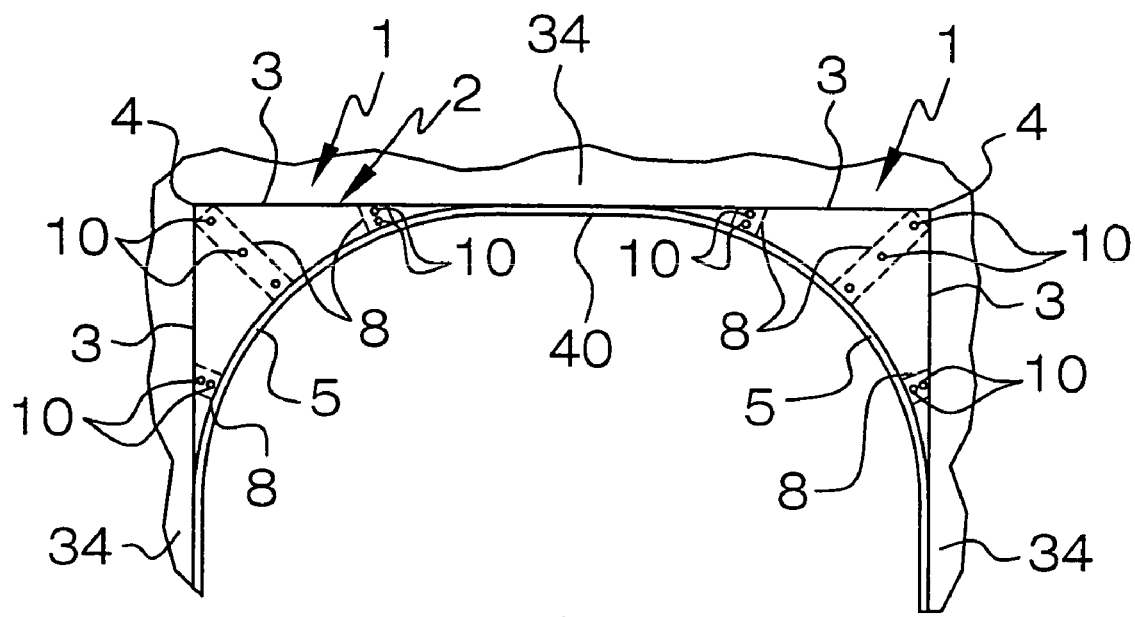
FIG. 2 is a top view of a pair of pieces of an illustrative embodiment of a surface template according to the present invention, provided in place at a pair of corners between adjoining walls and illustrating a curved wall provided over the surface templates.
Figure 3A:
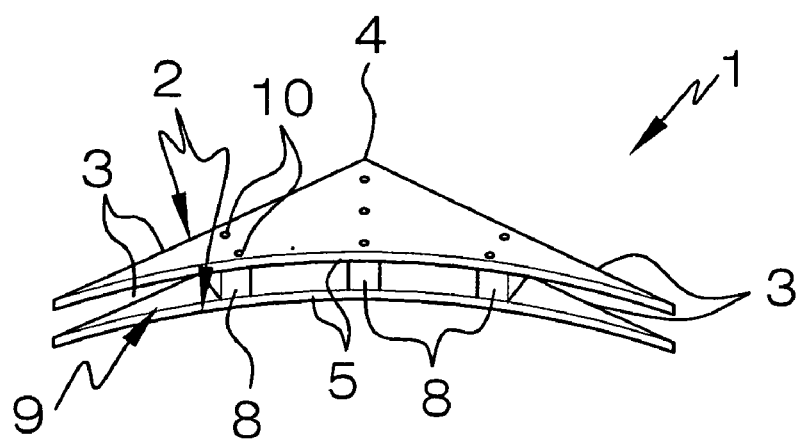
FIG. 3A is a front perspective view of an illustrative embodiment of a surface template according to the present invention.

Referring initially to FIG. 3A of the drawings, a first illustrative embodiment of a surface template according to the present invention is generally indicated by reference numeral 1. The surface template 1 typically includes at least two spaced-apart template panels 2 generally having the same size and shape. Each template panel 2 may be wooden, plastic or metal, for example, and typically includes a pair of side edges 3 which meet at a corner 4. The side edges 3 of each template panel 2 may be disposed at any desired angle with respect to each other to generally correspond with and match the angle between adjoining walls 34 in use, as shown in FIGS. 1 and 2 and will be hereinafter further described. Typically, the side edges 3 are disposed at a generally perpendicular or 90-degree angle with respect to each other to engage adjoining walls 34 which are disposed at a generally perpendicular or 90-degree angle to each other.

Each template panel 2 of each surface template 1 further includes a surface edge 5 which extends between the side edges 3. The surface edge 5 may have any configuration which is to be subsequently provided in a surface between the adjoining walls 34. In FIG. 3A, the surface edge 5 has a generally curved or concave configuration. At least one spacer 8 is provided between the template panels 2. Multiple spacers 8 may be provided between the template panels 2, in spaced-apart relationship to each other. Multiple fasteners 10 may extend through registering fastener openings (not shown) provided in the template panels 2 and each spacer 8 to secure the spacers 8 between the template panels 2. Alternatively, the template panels 2 and spacers 8 may be casted, molded or formed in one piece. A space 9 is typically defined by the spacers 8, between the template panels 2.

Referring to FIGS. 1 and 2 of the drawings, in typical application, each surface template 1 is provided between adjoining walls 34, which meet at a corner 35, to form a surface 40 having a curved configuration, as shown, or an alternative configuration. Accordingly, the side edges 3 of each surface template 1 are attached to the respective walls 34 using fasteners (not shown), adhesive (not shown) or a combination of fastening techniques. Multiple surface templates 1 are typically secured to the adjoining walls 34, between a floor 36 and a ceiling 37, in spaced-apart relationship to each other, as shown in FIG. 1. Therefore, a curved surface 40 can be formed against the surface edges 5 of the template panels 2 on each of the surface templates 1, typically between the floor 36 and the ceiling 37, and may be continuous with the walls 34. The curved surface 40 can be plastered and textured, as desired, to impart a desired appearance to the curved surface 40, which may or may not match that of the walls 34.

Figure 3B:
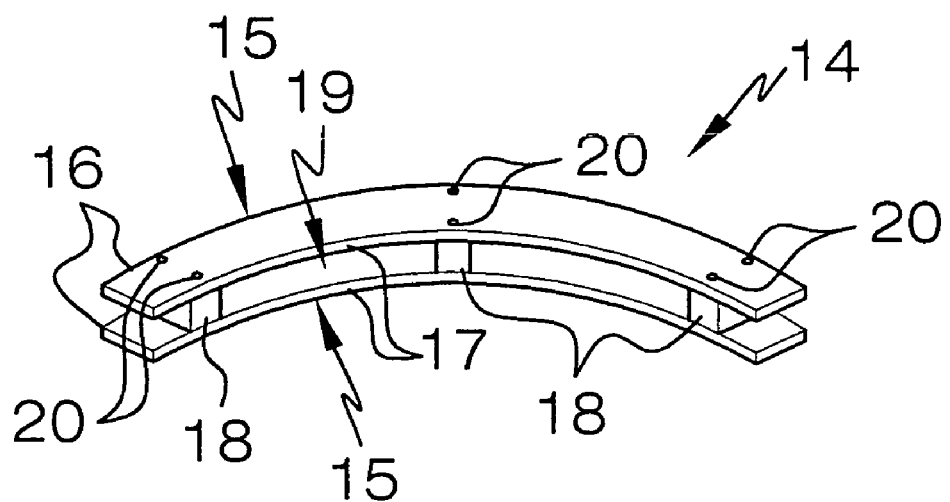
FIG. 3B is a front perspective view of a second illustrative embodiment of a surface template according to the present invention.

Referring next to FIG. 3B, a second illustrative embodiment of the surface template according to the present invention is generally indicated by reference numeral 14. The surface template 14 includes at least two template panels 15, each of which may have a generally curved, arcuate or crescent shape. Each template panel 15 includes a generally convex outer edge 16 and a generally concave or alternatively-shaped inner edge 17. At least one, and typically, multiple spacers 18 may be provided between the adjacent template panels 15 and define a space 19. Fasteners 20 may extend through registering fastener openings (not shown) provided in the template panels 15 and each spacer 18. In use, the outer edges 16 of the template panels 15 are attached to a curved surface (not shown) for the formation of a second curved or alternatively-shaped surface (not shown) against the inner edges 17 of the respective template panels 15, typically in the same manner as was heretofore described with respect to the surface template 1 of FIGS. 1-3A.

Figure 3C:
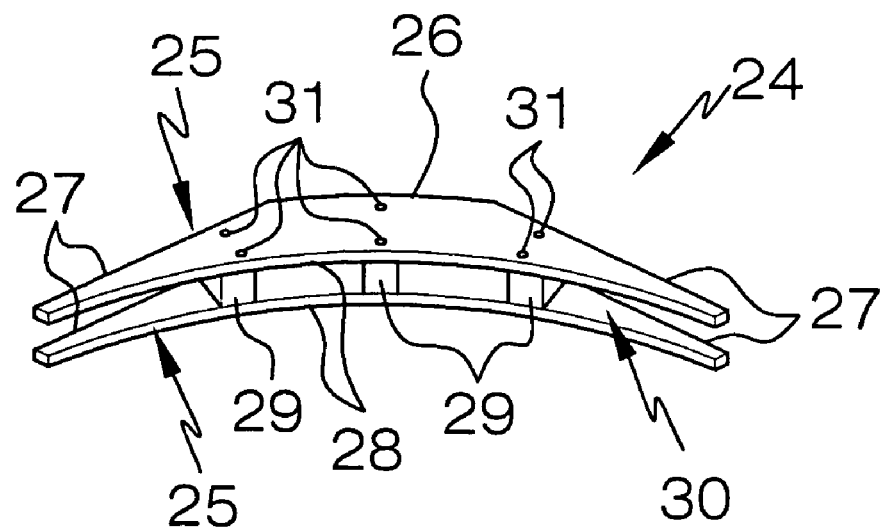
FIG. 3C is a front perspective view of a third illustrative embodiment of a surface template according to the present invention.

Referring next to FIG. 3C, a third illustrative embodiment of the surface template according to the present invention is generally indicated by reference numeral 24. The surface template 24 includes at least two template panels 25. Each template panel 25 typically has a generally straight or flat outer edge 26, a pair of side edges 27 which extend from the outer edge 26, and a surface edge 28 which extends between the side edges 27. The surface edge 28 of each template panel 25 may have a generally curved, arcuate or concave configuration, as shown, or an alternative shape. At least one, and typically, multiple spacers 29 may be provided between the at least two template panels 25 and define a space 30. Fasteners 31 may extend through registering fastener openings (not shown) provided in the template panels 25 and each spacer 29. In use, the outer edges 26 and side edges 27 of the respective template panels 25 are attached to a correspondingly-shaped surface (not shown) for the formation of a curved or alternatively-shaped surface (not shown) against the surface edges 28 of the respective template panels 25, typically in the same manner as was heretofore described with respect to the surface template 1 of FIGS. 1-3A.

While the preferred embodiments of the invention have been described above, it will be recognized and understood that various modifications can be made in the invention and the appended claims are intended to cover all such modifications which may fall within the spirit and scope of the invention.

What is claimed is:

1. A surface template comprising:
    at least two template panels of similar size and shape and disposed in spaced-apart relationship to each other, each of said at least two template panels having a pair of side edges disposed in generally perpendicular relationship to each other and a surface edge extending between said pair of side edges;
    at least one spacer comprises a plurality of spacers disposed in spaced-apart relationship to each other;
    at least one fastener extending through said at least two template panels and said at least one spacer; and, wherein the side edges of the template panels are capable of securing against adjoining surfaces for forming a surface between the adjoining surfaces.

2. The surface template of claim 1 wherein said surface edge has a generally concave shape.

3. A method of forming a surface between adjoining surfaces, comprising:
    providing at least one surface template having at least two template panels of similar size and shape in spaced-apart relationship to each other and a surface edge each provided on one of said at least two template panels, respectively;
    securing said at least one surface template against said adjoining surfaces;
    providing at least one spacer between said at least two template panels;
    providing at least one fastener extending through said at least two template panels and said at least one spacer;
    forming said surface against said at least two surface edges provided on said at least two template panels, respectively.

4. The method of claim 3 wherein said at least two template panels of said at least one surface template each comprises a pair of side edges disposed in generally perpendicular relationship to each other.

5. The method of claim 3 wherein said at least two surface edges each has a generally concave shape.

6. The method of claim 3 wherein said at least one spacer comprises a plurality of spacers.

7. The method of claim 3 wherein said at least two template panels each comprises a generally convex outer edge and a generally concave inner edge.

8. The method of claim 3 wherein said at least two template panels each comprises an outer edge and a pair of side edges extending from said outer edge.

9. The method of claim 3 wherein said securing said at least one surface template against said adjoining surfaces comprises securing a plurality of surface templates against said adjoining surfaces in spaced-apart relationship to each other.

10. The method of claim 9 wherein said forming said surface against said at least two surface edges provided on said at least two template panels, respectively, comprises forming a generally concave surface against said at least two surface edges.

* * * * *